Patented July 13, 1954

2,683,708

UNITED STATES PATENT OFFICE 2,683,708

AZO COMPOUNDS PREPARED FROM A 2-AMINO-5-NITROTHIAZOLE AND AN N - MONOSUBSTITUTED ANILINE COMPOUND

Joseph B. Dickey and Edmund B. Towne, Kingsport, Tenn., assignors to Eastman Kodak Company, Rochester, N. Y., a corporation of New Jersey No Drawing. Application December 21, 1951, Serial No. 262,901

9 Claims. (Cl. 260—158)

This invention relates to new azo compounds and their application to the art of dyeing or coloring.

We have discovered that the azo compounds having the general formula:

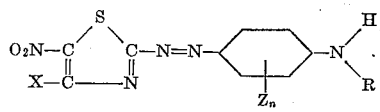

wherein R represents an alkyl group having 1 to 10, inclusive, carbon atoms, an alkoxyalkyl group having 3 to 6, inclusive, carbon atoms, a hydroxyalkyl group having 2 to 5, inclusive, carbon atoms, a cyanoalkyl group having 2 to 6, inclusive, carbon atoms, a sulfoalkyl group having 2 to 4, inclusive, carbon atoms, a sulfatoalkyl group having 2 to 5, inclusive, carbon atoms, a phosphatoalkyl group having 2 to 5, inclusive, carbon atoms, a phosphonoalkyl group having 2 to 5, inclusive, carbon atoms, a β-nitroethyl group, an alkenyl group having 2 to 4, inclusive, carbon atoms, a cyclohexyl group, a cyclopentyl group, a benzyl group, a phenethyl group, a chlorallyl group, a tetrahydrofurfuryl group, a pyridyl group or a —($CH_2$)$_m$—$COOR_1$ group, wherein $m$ is 1, 2 or 3 and $R_1$ represents an alkyl group having 1 to 4, inclusive, carbon atoms, X represents a hydrogen atom, an alkyl group having 1 to 6, inclusive, carbon atoms, a cyano group, a trifluoromethyl group or a

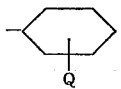

group, wherein Q represents a hydrogen atom, a nitro group, a chlorine atom, a bromine atom or an alkyl group having 1 to 4, inclusive, carbon atoms, Z represents an alkyl group having 1 to 4, inclusive, carbon atoms, an alkoxy group having 1 to 4, inclusive, carbon atoms, a chlorine atom, a bromine atom, a fluorine atom or a

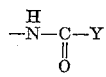

group, wherein Y represents an alkyl group having 1 to 3, inclusive, carbon atoms and $n$ is 0, 1 or 2, are valuable dyes for coloring textile materials made of or containing a cellulose alkyl carboxylic acid ester having two to four carbon atoms in the acid groups thereof. They are especially of use for the coloration of cellulose acetate textile materials. When applied to the aforesaid textile materials they give violet, reddish-blue, blue and greenish-blue dyeings which, in general, have good fastness to light and gas. The compounds of our invention also color wool, silk, nylon, polyethylene terephthalate and modified polyacrylonitrile textile materials similar colors but do not appear to be as good dyes for these latter materials as they are for cellulose acetate.

It is an object of our invention to provide new azo compounds. Another object is to provide a satisfactory process for the preparation of our new azo compounds. A further object is to provide dyed textile materials, especially cellulose acetate textile materials, which have good fastness to light and gas.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new azo compounds of our invention are prepared by diazotizing a 2-amino-5-nitrothiazole having the formula:

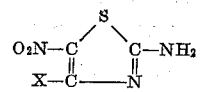

and coupling the diazonium compound obtained with a compound having the formula:

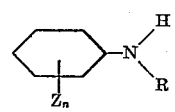

R, X, Z and $n$ in the foregoing formulas have the meaning previously assigned to them.

Typical of the 2-amino-5-nitrothiazole compounds used in the preparation of the azo compounds of our invention are: 2-amino-5-nitrothiazole, 2 - amino - 4 - methyl - 5 - nitrothiazole, 2 - amino - 4 - ethyl - 5 - nitrothiazole, 2 - amino-4 - n - butyl - 5 - nitrothiazole, 2 - amino - 4 - n-hexyl - 5 - nitrothiazole, 2 - amino - 4 - cyano-5 - nitrothiazole, 2 - amino - 4 - trifluoromethyl-5 - nitrothiazole, 2 - amino - 4 - phenyl - 5-nitrothiazole, 2 - amino - 4 - (o - nitrophenyl)-5 - nitrothiazole, 2 - amino - 4 - (m - nitrophenyl) - 5 - nitrothiazole, 2 - amino - 4 - (p-nitrophenyl) - 5 - nitrothiazole, 2 - amino - 4-(p - chlorophenyl) - 5 - nitrothiazole, 2 - amino-4 - (o - bromophenyl) - 5 - nitrothiazole, 2-amino - 4 - (o - fluorophenyl) - 5 - nitrothiazole, 2 - amino - 4 - (o - chlorophenyl) - 5 - nitrothiazole, 2 - amino - 4 - (p - fluorophenyl) - 5- nitrothiazole, 2 - amino - 4 - (o - methylphenyl) - 5 - nitrothiazole, 2 - amino - 4 - (p - methylphenyl) - 5 - nitrothiazole and 2 - amino - 4 - (p - n - butylphenyl) - 5 - nitrothiazole. The use of 2-amino-5-nitrothiazole is ordinarily preferred.

Illustrative of the alkyl groups represented by R are the methyl, the ethyl, the n-propyl, the isopropyl, the n-butyl, the n-amyl, the n-hexyl, the n-heptyl, the n-octyl, the n-nonyl and the n-decyl groups. Illustrative of the alkoxyalkyl groups represented by R are the $\beta$-methoxyethyl, $\beta$-ethoxyethyl, $\beta$-n-propoxyethyl, $\beta$-n-butoxyethyl, the $\gamma$-n-propoxypropyl, the 2,3-dimethoxypropyl, the 3-methoxy-2-hydroxypropyl and the 3-methoxy-2-methyl-2-hydroxypropyl groups. Similarly, the $\beta$-hydroxyethyl, the $\beta$-hydroxypropyl, the $\gamma$-hydroxypropyl, the $\beta,\gamma$-dihydroxypropyl, the $\beta$-methyl-$\beta,\gamma$-dihydroxypropyl, the $\delta$-hydroxybutyl, the $\epsilon$-hydroxyamyl and the $\delta,\epsilon$-dihydroxyamyl groups are illustrative of the hydroxyalkyl groups R represents. Illustrative of the cyanoalkyl groups R represents are the $\beta$-cyanoethyl, the $\gamma$-cyanopropyl, the $\delta$-cyanobutyl and the $\epsilon$-cyanopentyl groups.

Sulfoalkyl groups represented by R include, for example, the $\beta$-sulfoethyl, the $\gamma$-sulfopropyl and the $\delta$-sulfobutyl groups. Sulfatoalkyl groups represented by R include, for example, the $\beta$-sulfatoethyl, the $\beta$-sulfato-n-propyl, the $\gamma$-sulfatopropyl, sulfated $\beta,\gamma$-dihydroxypropyl, the $\delta$-sulfatobutyl and the $\epsilon$-sulfatoamyl groups. Illustrative phosphatoalkyl groups represented by R are the $\beta$-phosphatoethyl group, the $\gamma$-phosphatopropyl group, the $\delta$-phosphatobutyl group and the $\epsilon$-phosphatoamyl groups. Phosphonoalkyl groups represented by R include, for example, the $\beta$-phosphonoethyl, the $\gamma$-phosphonopropyl, the $\delta$-phosphonobutyl and the $\epsilon$-phosphonoamyl groups. The vinyl, the allyl, the methallyl and the crotyl groups are illustrative of the alkenyl groups R represents. Illustrative of the $(-CH_2)_m-COOR_1$ groups R represents are the $-CH_2COOCH_3$, the $-CH_2COOC_2H_5$, the $-CH_2COOCH_2CH_2CH_3$, the

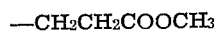

the $-CH_2CH_2COOC_2H_5$, the

the $-CH_2CH_2CH_2COOCH_3$, the

and the $-CH_2CH_2CH_2COOCH_2CH_2CH_2CH_3$ groups.

Similarly the methyl, the ethyl, the n-propyl, the isopropyl, the n-butyl, the secondary butyl and the tertiary butyl groups are illustrative of the alkyl groups represented by Z and Q. Illustrative of alkoxy groups represented by Z are the methoxy, the ethoxy, the n-propoxy, the isopropoxy and the n-butoxy groups. The methyl, the ethyl, the n-propyl and the isopropyl groups are illustrative of the alkyl groups represented by Y.

The following examples illustrate the azo compounds of our invention and their manner of preparation:

EXAMPLE 1

A. *Preparation of nitrosyl sulfuric acid*

1.52 grams of sodium nitrite were added portionwise to 10 cc. of concentrated sulfuric acid, with stirring, and the temperature of the reaction mixture was allowed to rise to 65° C. The resulting solution was then cooled to 5° C. and 20 cc. of a mixture of 3 cc. of propionic acid and 17 cc. of acetic acid were added dropwise, with stirring, while allowing the temperature to rise to 15° C. and maintaining it at this temperature during the remainder of the addition.

B. *Diazotization*

The nitrosyl sulfuric acid mixture prepared as described above was cooled to 0° C.–5° C. and then 2.9 grams (0.02 mole) of 2-amino-5-nitrothiazole were added portionwise, while stirring, after which 20 cc. of a propionic-acetic acid mixture prepared as described above were added while keeping the temperature of the reaction mixture at 0° C.–5° C. The reaction mixture thus obtained was then stirred at about 0° C.–5° C. for three hours and excess sodium nitrite present in the mixture was destroyed by adding one to two grams of urea. A clear diazonium solution was obtained.

C. *Coupling*

12. cc. of the 2-amino-5-nitrothiazole diazonium solution prepared as described in B above were added, with stirring, at 0° C.–5° C. to a solution of 1.16 grams of N-$\beta,\gamma$-dihydroxypropyl-2-methoxy-5-chloroaniline in 10 cc. of a 1:6 mixture of propionic-acetic acid (i. e. 1 part by volume of propionic acid to 6 parts by volume of acetic acid). After a short time the reaction mixture was made neutral to Congo paper by adding sodium acetic portionwise and the coupling reaction was allowed to proceed for three hours. The reaction mixture was then poured into cold water (15° C.) and after stirring a short time, it was filtered to recover the dye compound formed on the filter. The dye compound thus obtained was washed well with water and dried. 1.32 grams of the dye compound having the formula:

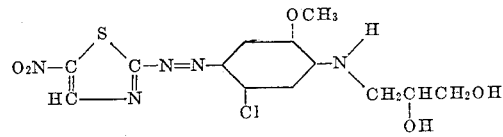

were obtained. This compound dyes cellulose acetate textile materials deep, bright reddish-blue shades having good fastness to light and excellent fastness to gas. The leveling and discharge properties of the dye are also excellent. The dye compound also colors nylon, wool and silk textile materials similar reddish-blue shades.

EXAMPLE 2

12 cc. of the 2-amino-5-nitrothiazole diazonium solution prepared as described in B of Example 1 were added, with stirring, at 3° C. to a solution of 1.34 grams of N-$\beta,\gamma$-dihydroxypropyl-2-ethoxy-5-acetaminoaniline in 10 cc. of a 1:6 mixture of propionic-acetic acid. Upon working up the reaction mixture in accordance with the procedure described in Example 1, 1.07 grams of a dye which dyes cellulose acetate textile materials bright shades of blue were obtained. The fastness properties are the same as the dye of Example 1.

EXAMPLE 3

1.06 grams of 2-amino-4-trifluoromethyl-5-nitrothiazole were diazotized and the diazonium compound obtained was coupled with 1.34 grams of N-$\beta,\gamma$-dihydroxypropyl-2-ethoxy-5-acetaminoaniline. Diazotization, coupling and recovery of the dye compound formed were carried out in accordance with the procedure described in Example 1. 1.72 grams of a dye compound having the formula:

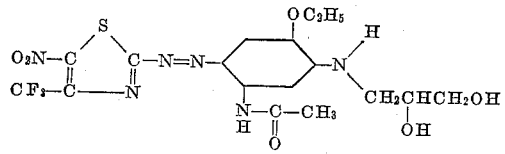

were obtained. It colors cellulose acetate textile materials blue shades and has properties similar to the dye of example 1. The dye compound also colors nylon, wool and silk textile materials blue shades.

EXAMPLE 4

0.85 gram of 2-amino-4-cyano-5-nitrothiazole were diazotized and the diazonium compound obtained was coupled with 1.30 grams of N-$\beta$-methyl - $\beta,\gamma$ - dihydroxypropyl - 2 - ethoxy - 5-chloroaniline. Diazotization, coupling and recovery of the dye compound formed were carried out in accordance with the general procedure described in Example 1. 1.23 grams of a dye compound having the formula:

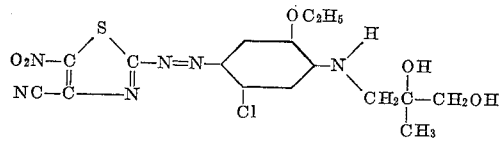

were obtained. It dyes cellulose acetate textile materials bright blue shades having very good fastness to light and gas. Discharge prints were sharp and white. This dye compound also colors nylon, wool and silk clear shades of blue.

EXAMPLE 5

12 cc. of the 2-amino-5-nitrothiazole diazonium solution prepared as described in B of Example 1 were added, with stirring, at 3° C. to a solution of 0.86 gram of N-$\beta$-hydroxyethyl-m-chloroaniline in 10 cc. of a 1:6 mixture of propionic-acetic acid. Upon working up the reaction mixture in accordance with the procedure described in Example 1, 1.40 grams of a compound which dyes cellulose acetate textile materials bright violet shades were obtained. The light and gas fastness of the dyeings are very good and the dischargeability of the dyeings is sharp and white. The dye compound also colors nylon, wool and silk textile materials violet shades.

EXAMPLE 6

12 cc. of a 2-amino-5-nitrothiazole diazonium solution prepared as described in B of Example 1 were added, with stirring, at 3° C. to a solution of 1.06 grams of N-$\beta,\gamma$-dihydroxypropyl-2-methoxy-5-methylaniline in 10 cc. of a 1:6 mixture of propionic-acetic acid. Upon working up the reaction mixture in accordance with the procedure described in Example 1, 1.01 grams of a compound which dyes cellulose acetate textile materials bright, pure blue shades were obtained. The gas fastness of the dyeings is excellent but the light fastness is not as good as that obtained with the dye compounds of the preceding examples. The dye levels well and its dyeings discharge to a pure white. It also dyes nylon, wool and silk textile materials blue shades.

EXAMPLE 7

12 cc. of a 2-amino-5-nitrothiazole diazonium solution prepared as described in B of Example 1 were added, with stirring, at 3° C. to a solution of 1.21 grams of N-(4,5-dihydroxyamyl)-2-methoxy-5-methylaniline in 10 cc. of a 1:6 mixture of propionic-acetic acid. Upon working up the reaction mixture in accordance with the procedure described in Example 1, 1.29 grams of a dye compound which colors cellulose acetate textile materials blue shades were obtained. The properties of the dye are similar to those of the dye of Example 6.

EXAMPLE 8

1.33 grams of 2-amino-4-(m-nitrophenyl)-5-nitrothiazole were diazotized and the diazonium compound obtained was coupled with 1.27 grams of N - $\beta,\gamma$ - dihydroxypropyl - 2 - methoxy - 5-acetaminoaniline. Diazotization, coupling and recovery of the dye compound formed were carried out in accordance with the general procedure described in Example 1. 1.55 grams of a dye compound which colors cellulose acetate textile materials blue-green shades were obtained. The fastness properties are similar to those of the dye of Example 6.

EXAMPLE 9

1.06 grams of 2-amino-4-trifluoromethyl-5-nitrothiazole were diazotized and the diazonium compound obtained was added dropwise, with vigorous stirring, to a dilute sulfuric acid solution of 1.21 grams of N-(3-methoxy-2-hydroxypropyl)-2,5-dimethoxyaniline while keeping the temperature of the reaction mixture below 5° C. Then the reaction mixture was made neutral to Congo paper by adding sodium acetate portionwise, with stirring, and the coupling reaction was allowed to proceed for three hours at a temperature below 5° C. The reaction mixture was then drowned in cold water (15° C.) and filtered to recover the dye compound formed. The dye compound thus obtained was washed well with water and dried. It is obtained as a black powder and dyes cellulose acetate textile materials bright blue shades having good fastness to light and gas. The dyeings discharge especially well and have good crocking and wash fastness.

EXAMPLE 10

0.85 gram of 2-amino-4-cyano-5-nitrothiazole were diazotized and the diazonium compound obtained was coupled with a dilute hydrochloric acid solution of 1.34 grams of N-($\beta$-methyl-$\beta,\gamma$-dihydroxypropyl)-2-methoxy-5-acetaminoaniline. Upon working up the reaction mixture in accordance with the general procedure described in Example 9, 1.16 grams of dye compound are obtained as a blue-black powder. It dyes cellulose acetate textile materials bright blue shades and has the same fastness properties as the dye of Example 9. It also dyes wool, nylon and silk textile materials blue shades.

EXAMPLE 11

1.59 grams of 2-amino-4-methyl-5-nitrothiazole were diazotized and the diazonium compound obtained was coupled with 1.37 grams of N-$\beta$-hydroxyethylaniline. Diazotization, coupling and recovery of the dye compound formed were carried out in accordance with the general procedure described in Example 1. The dye compound obtained colors cellulose acetate textile materials rubine shades.

EXAMPLE 12

1.73 grams of 2-amino-4-ethyl-5-nitrothiazole were diazotized and the diazonium compound obtained was coupled with 1.67 grams of N-$\beta,\gamma$-dihydroxypropylaniline. Diazotization, coupling and recovery of the dye compound formed were carried out in accordance with the general procedure described in Example 1. The dye compound obtained colors cellulose acetate textile materials rubine shades.

EXAMPLE 13

2.01 grams of 2-amino-4-n-butyl-5-nitrothiazole were diazotized and the diazonium compound obtained was coupled with 1.51 grams of N-β-hydroxyethyl-m-toluidine. Diazotization, coupling and recovery of the dye compound formed were carried out in accordance with the general procedure described in Example 1. The dye compound obtained colors cellulose acetate textile materials violet shades.

EXAMPLE 14

2.29 grams of 2-amino-4-n-hexyl-5-nitrothiazole were diazotized and the diazonium compound obtained was coupled with 2.46 grams of N-β,γ-dihydroxypropyl-m-bromoaniline. Diazotization, coupling and recovery of the dye compound formed were carried out in accordance with the general procedure described in Example 1. The dye compound obtained colors cellulose acetate textile materials reddish-violet shades.

EXAMPLE 15

2.66 grams of 2-amino-4-(o-nitrophenyl)-5-nitrothiazole were diazotized and the diazonium compound obtained was coupled with 1.55 grams of N-β-hydroxyethyl-m-fluoroaniline. Diazotization, coupling and recovery of the dye compound formed were carried out in accordance with the general procedure described in Example 1. The dye compound obtained colors cellulose acetate textile materials reddish-blue shades.

EXAMPLE 16

2.66 grams of 2-amino-4-(p-nitrophenyl)-5-nitrothiazole were diazotized and the diazonium compound obtained was coupled with 1.51 grams of N-β-hydroxypropylaniline. Diazotization, coupling and recovery of the dye compound formed were carried out in accordance with the general procedure described in Example 1. The dye compound obtained colors cellulose acetate textile materials reddish-blue shades.

EXAMPLE 17

2.55 grams of 2-amino-4-(p-chlorophenyl)-5-nitrothiazole were diazotized and the diazonium compound obtained was coupled with 2.02 grams of N-β,γ-dihydroxypropyl-m-chloroaniline. Diazotization, coupling and recovery of the dye compound formed were carried out in accordance with the general procedure described in Example 1. The dye compound obtained colors cellulose acetate textile materials reddish-violet shades.

EXAMPLE 18

3 grams of 2-amino-4-(o-bromophenyl)-5-nitrothiazole were diazotized and the diazonium compound obtained was coupled with 2.32 grams of N-β,γ-dihydroxypropyl-2-methoxy-5-chloroaniline. Diazotization, coupling and recovery of the dye compound formed were carried out in accordance with the general procedure described in Example 1. The dye compound obtained colors cellulose acetate textile materials reddish-blue shades.

EXAMPLE 19

2.39 grams of 2-amino-4-(o-fluorophenyl)-5-nitrothiazole were diazotized and the diazonium compound obtained was coupled with 2.38 grams of N-γ-hydroxypropyl-2-methoxy-5-acetaminoaniline. Diazotization, coupling and recovery of the dye compound formed were carried out in accordance with the general procedure described in Example 1. The dye compound obtained colors cellulose acetate textile materials blue shades.

EXAMPLE 20

2.35 grams of 2-amino-4-(p-methylphenyl)-5-nitrothiazole were diazotized and the diazonium compound obtained were coupled with 1.97 grams of N-β,γ-dihydroxypropyl-m-methoxyaniline. Diazotization, coupling and recovery of the dye compound formed were carried out in accordance with the general procedure described in Example 1. The dye compound obtained colors cellulose acetate textile materials reddish-blue shades.

EXAMPLE 21

2.77 grams of 2-amino-4-(p-n-butylphenyl)-5-nitrothiazole were diazotized and the diazonium compound obtained was coupled with 2.24 grams of N-β,γ-dihydroxypropyl-m-acetaminoaniline. Diazotization, coupling and recovery of the dye compound formed were carried out in accordance with the general procedure described in Example 1. The dye compound obtained colors cellulose acetate textile materials reddish-blue shades.

EXAMPLE 22

2.55 grams of 2-amino-4-(o-chlorophenyl)-5-nitrothiazole were diazotized and the diazonium compound obtained was coupled with 2.46 grams of N-β-hydroxyethyl-2-methoxy-5-bromoaniline. Diazotization, coupling and recovery of the dye compound formed were carried out in accordance with the general procedure described in Example 1. The dye compound obtained colors cellulose acetate textile materials reddish-blue shades.

EXAMPLE 23

2.39 grams of 2-amino-4-(p-fluorophenyl)-5-nitrothiazole were diazotized and the diazonium compound obtained was coupled with 2.08 grams of N-β-hydroxyethyl-m-propionylaminoaniline. Diazotization, coupling and recovery of the dye compound formed were carried out in accordance with the general procedure described in Example 1. The dye compound obtained colors cellulose acetate textile materials reddish-blue shades.

EXAMPLE 24

2.35 grams of 2-amino-4-(o-methylphenyl)-5-nitrothiazole were diazotized and the diazonium compound obtained was coupled with 2.46 grams of N-β,γ-dihydroxypropyl-2-ethoxy-5-chloroaniline. Diazotization, coupling and recovery of the dye compound formed were carried out in accordance with the general procedure described in Example 1. The dye compound obtained colors cellulose acetate textile materials reddish-blue shades.

EXAMPLE 25

1.45 grams (0.01 mole) of 2-amino-5-nitrothiazole were added portionwise to 15 grams of concentrated $H_2SO_4$ cooled to 0° C.–5° C. To the solution thus obtained was added dropwise a nitrosyl sulfuric acid solution prepared by adding 0.76 gram of sodium nitrite portionwise to 5 cc. of concentrated sulfuric acid, with stirring, and allowing the temperature to rise to 65° C.

followed by cooling to 5° C. The diazotization reaction which takes place was allowed to proceed for 3 hours at 0° C. A clear diazonium solution of 2-amino-5-nitrothiazole was obtained.

The diazonium solution prepared as described above was added, with stirring, to 1.07 grams of N-methylaniline dissolved in dilute sulfuric acid. The excess mineral acid was gradually neutralized with a concentrated aqueous sodium acetate solution until the reaction mixture was neutral to Congo paper and after about two hours' time, the dye compound which precipitated was recovered by filtration, washed well with water and dried. The dye compound thus obtained colors cellulose acetate textile materials rubine shades.

By the use of 1.21 grams of N-ethylaniline in the above example, a dye compound is obtained which colors cellulose acetate textile materials rubine shades.

EXAMPLE 26

1.45 grams of 2-amino-5-nitrothiazole were diazotized and the diazonium compound obtained was coupled with 1.84 grams of N-n-butyl-m-chloroaniline. Diazotization, coupling and recovery of the dye compound formed were carried out in accordance with the general procedure described in Example 25. The dye compound obtained colors cellulose acetate textile materials rubine shades.

By the use of 2.12 grams of N-n-hexyl-m-chloroaniline in the above example, a dye compound is obtained which colors cellulose acetate textile materials rubine shades.

EXAMPLE 27

1.45 grams of 2-amino-5-nitrothiazole were diazotized and the diazonium compound obtained was coupled with 2.33 grams of N-n-decylaniline. Diazotization, coupling and recovery of the dye compound formed were carried out in accordance with the general procedure described in Example 25. The dye compound obtained colors cellulose acetate textile materials rubine shades.

By the use of 2.05 grams of N-n-octylaniline in the above example, a dye compound is obtained which colors cellulose acetate textile materials rubine shades.

EXAMPLE 28

1.45 grams of 2-amino-5-nitrothiazole were diazotized and the diazonium compound obtained was coupled with 1.75 grams of N-cyclohexylaniline. Diazotization, coupling and recovery of the dye compound formed were carried out in accordance with the general procedure described in Example 1. The dye compound obtained colors cellulose acetate textile materials rubine shades.

By the use of 1.96 grams of N-cyclopentyl-m-chloroaniline in the above example, a dye compound is obtained which colors cellulose acetate textile materials rubine shades.

EXAMPLE 29

1.45 grams of 2-amino-5-nitrothiazole were diazotized and the diazonium compound obtained was coupled with 1.79 grams of N-ε-hydroxyamylaniline. Diazotization, coupling and recovery of the dye compound formed were carried out in accordance with the general procedure described in Example 1. The dye compound obtained colors cellulose acetate textile materials rubine shades.

By the use of 1.65 grams of N-δ-hydroxybutylaniline in the above example, a dye compound is obtained which colors cellulose acetate textile materials rubine shades.

EXAMPLE 30

1.45 grams of 2-amino-5-nitrothiazole were diazotized and the diazonium compound obtained was coupled with 1.83 grams of N-benzylaniline. Diazotization, coupling and recovery of the dye compound formed were carried out in accordance with the general procedure described in Example 1. The dye compound obtained colors cellulose acetate textile materials rubine shades.

By the use of 2.18 grams of N-benzyl-m-chloroaniline in the above example, a dye compound is obtained which colors cellulose acetate textile materials rubine shades.

EXAMPLE 31

1.45 grams of 2-amino-5-nitrothiazole were diazotized and the diazonium compound obtained was coupled with 1.97 grams of N-phenethylaniline. Diazotization, coupling and recovery of the dye compound formed were carried out in accordance with the general procedure described in Example 1. The dye compound obtained colors cellulose acetate textile materials rubine shades.

By the use of 2.62 grams of N-phenethyl-2-methoxy-5-chloroaniline in the above example, a dye compound is obtained which colors cellulose acetate textile materials blue shades.

EXAMPLE 32

1.45 grams of 2-amino-5-nitrothiazole were diazotized and the diazonium compound obtained was coupled with 1.19 grams of N-vinylaniline. Diazotization, coupling and recovery of the dye compound formed were carried out in accordance with the general procedure described in Example 1. The dye compound obtained colors cellulose acetate textile materials red shades.

By the use of 1.47 grams of N-crotylaniline in the above example, a dye compound is obtained which colors cellulose acetate textile materials rubine shades.

EXAMPLE 33

1.45 grams of 2-amino-5-nitrothiazole were diazotized and the diazonium compound obtained was coupled with 1.31 grams of N-allylaniline. Diazotization, coupling and recovery of the dye compound formed were carried out in accordance with the general procedure described in Example 1. The dye compound obtained colors cellulose acetate textile materials rubine shades.

By the use of 1.47 grams of N-methallylaniline in the above example, a dye compound is obtained which colors cellulose acetate textile materials rubine shades.

EXAMPLE 34

1.45 grams of 2-amino-5-nitrothiazole were diazotized and the diazonium compound obtained was coupled with 1.78 grams of N-tetrahydrofurfurylaniline. Diazotization, coupling and recovery of the dye compound formed were carried out in accordance with the general procedure described in Example 1. The dye compound obtained colors cellulose acetate textile materials rubine shades.

By the use of 2.65 grams of N-tetrahydrofurfuryl-2-methoxy-5-acetaminoaniline in the above example, a dye compound is obtained which colors cellulose acetate textile materials blue shades.

EXAMPLE 35

1.45 grams of 2-amino-5-nitrothiazole were diazotized and the diazonium compound obtained was coupled with 1.70 grams of N-2-pyridylaniline. Diazotization, coupling and recovery of the dye compound formed were carried out in accordance with the general procedure described in Example 1. The dye compound obtained colors cellulose acetate textile materials rubine shades.

By the use of 1.70 grams of N-4-pyridylaniline in the above example, a dye compound is obtained which colors cellulose acetate textile materials rubine shades.

EXAMPLE 36

1.45 grams of 2-amino-5-nitrothiazole were diazotized and the diazonium compound obtained was coupled with 1.51 grams of N-$\beta$-methoxyethylaniline. Diazotization, coupling and recovery of the dye compound formed were carried out in accordance with the general procedure described in Example 1. The dye compound obtained colors cellulose acetate textile materials rubine shades.

By the use of 1.65 grams of N-$\beta$-ethoxyethylaniline in the above example, a dye compound is obtained which colors cellulose acetate textile materials rubine shades.

EXAMPLE 37

1.45 grams of 2-amino-5-nitrothiazole were diazotized and the diazonium compound obtained was coupled with 1.93 grams of N-$\beta$-n-propoxyethyl-m-toluidine. Diazotization, coupling and recovery of the dye compound formed were carried out in accordance with the general procedure described in Example 1. The dye compound obtained colors cellulose acetate textile materials violet shades.

By the use of 2.07 grams of N-$\beta$-n-butoxyethyl-m-toluidine in the above example, a dye compound is obtained which colors cellulose acetate textile materials violet shades.

EXAMPLE 38

1.45 grams of 2-amino-5-nitrothiazole were diazotized and the diazonium compound obtained was coupled with 1.68 grams of N-$\gamma$-chlorallylaniline. Diazotization, coupling and recovery of the dye compound formed were carried out in accordance with the general procedure described in Example 1. The dye compound obtained colors cellulose acetate textile materials rubine shades.

EXAMPLES 39

1.45 grams of 2-amino-5-nitrothiazole were diazotized and the diazonium compound obtained was coupled with 2.38 grams of N-$\beta,\gamma$-dihydroxypropyl-m-propionylaminoaniline. Diazotization, coupling and recovery of the dye compound formed were carried out in accordance with the general procedure described in Example 1. The dye compound obtained colors cellulose acetate textile materials violet shades.

By the use of 2.52 grams of N-$\beta,\gamma$-dihydroxypropyl-m-n-butyrylaminoaniline in the above example, a dye compound is obtained which colors cellulose acetate textile materials violet shades.

EXAMPLE 40

1.45 grams of 2-amino-5-nitrothiazole were diazotized and the diazonium compound obtained was coupled with 1.35 grams of N-isopropylaniline. Diazotization, coupling and recovery of the dye compound formed were carried out in accordance with the general procedure described in Example 1. The dye compound obtained colors cellulose acetate textile materials rubine shades.

By the use of 1.70 grams of N-isopropyl-m-chloroaniline in the above example, a dye compound is obtained which colors cellulose acetate textile materials rubine shades.

EXAMPLE 41

1.45 grams of 2-amino-5-nitrothiazole were diazotized and the diazonium compound obtained was coupled with 2.01 grams of N-$\beta$-sulfoethylaniline. Diazotization, coupling and recovery of the dye compound formed were carried out in accordance with the general procedure described in Example 1. The dye compound obtained colors cellulose acetate textile materials rubine shades.

By the use of 2.29 grams of N-$\delta$-sulfobutylaniline in the above example, a dye compound is obtained which colors cellulose acetate textile materials rubine shades.

EXAMPLE 42

1.45 grams of 2-amino-5-nitrothiazole were diazotized and the diazonium compound obtained was coupled with 2.17 grams of N-$\beta$-sulfatoethylaniline. Diazotization, coupling and recovery of the dye compound formed were carried out in accordance with the general procedure described in Example 1. The dye compound obtained colors cellulose acetate textile materials rubine shades.

By the use of 2.59 grams of N-$\epsilon$-sulfatoamylaniline in the above example, a dye compound is obtained which colors cellulose acetate textile materials rubine shades.

EXAMPLE 43

1.45 grams of 2-amino-5-nitrothiazole were diazotized and the diazonium compound obtained was coupled with 2.16 grams of N-$\beta$-phosphatoethylaniline. Diazotization, coupling and recovery of the dye compound formed were carried out in accordance with the general procedure described in Example 1. The dye compound obtained colors cellulose acetate textile materials rubine shades.

By the use of 2.58 grams of N-$\epsilon$-phosphatoamylaniline in the above example, a dye compound is obtained which colors cellulose acetate textile materials rubine shades.

EXAMPLE 44

1.45 grams of 2-amino-5-nitrothiazole were diazotized and the diazonium compound obtained was coupled with 2.35 grams of N-$\beta$-phosphonoethyl-m-chloroaniline. Diazotization, coupling and recovery of the dye compound formed were carried out in accordance with the general procedure described in Example 1. The dye compound obtained colors cellulose acetate textile materials rubine shades.

By the use of 2.77 grams of N-$\epsilon$-phosphonoamyl-m-chloroaniline in the above example, a dye compound is obtained which colors cellulose acetate textile materials rubine shades.

EXAMPLE 45

1.45 grams of 2-amino-5-nitrothiazole were diazotized and the diazonium compound obtained was coupled with 1.65 grams of N—$CH_2COOCH_3$-aniline. Diazotization, coupling and recovery of the dye compound formed were carried out in accordance with the general procedure described in Example 1. The dye compound obtained colors cellulose acetate textile materials rubine shades.

By the use of 1.93 grams of N-CH₂COOC₂H₅-m-toluidine in the above example, a dye compound is obtained which colors cellulose acetate textile materials rubine shades.

EXAMPLE 46

1.45 grams of 2-amino-5-nitrothiazole were diazotized and the diazonium compound obtained was coupled with 2.21 grams of N—CH₂COOCH₂CH₂CH₂CH₃-m-toluidine Diazotization, coupling and recovery of the dye compound formed were carried out in accordance with the general procedure described in Example 1. The dye compound obtained colors cellulose acetate textile materials rubine shades.

By the use of 2.35 grams of

N—CH₂CH₂COOCH₂CH₂CH₂CH₃-m-toluidine in the above example, a dye compound is obtained which colors cellulose acetate textile materials rubine shades.

EXAMPLE 47

1.45 grams of 2-amino-5-nitrothiazole were diazotized and the diazonium compound obtained was coupled with 1.79 grams of N—CH₂CH₂COOCH₃-aniline Diazotization, coupling and recovery of the dye compound formed were carried out in accordance with the general procedure described in Example 1. The dye compound obtained colors cellulose acetate textile materials rubine shades.

By the use of 1.93 grams of

N—CH₂CH₂CH₂COOCH₃-aniline in the above example, a dye compound is obtained which colors cellulose acetate textile materials rubine shades.

EXAMPLE 48

1.45 grams of 2-amino-5-nitrothiazole were diazotized and the diazonium compound obtained was coupled with 2.07 grams of N—CH₂CH₂CH₂COOCH₂H₅-aniline Diazotization, coupling and recovery of the dye compound formed were carried out in accordance with the general procedure described in Example 1. The dye compound obtained colors cellulose acetate textile materials rubine shades.

By the use of 2.35 grams of

N—CH₂CH₂CH₂COOCH₂CH₂CH₂CH₃-aniline in the above example, a dye compound is obtained which colors cellulose acetate textile materials rubine shades.

EXAMPLE 49

1.45 grams of 2-amino-5-nitrothiazole were diazotized and the diazonium compound obtained was coupled with 1.79 grams of N-β-hydroxyethyl-m-isopropylaniline. Diazotization, coupling and recovery of the dye compound formed were carried out in accordance with the general procedure described in Example 1. The dye compound obtained colors cellulose acetate textile materials rubine shades.

By the use of 1.95 grams of N-β-hydroxyethyl-m-isopropoxyaniline in the above example, a dye compound is obtained which colors cellulose acetate textile materials rubine shades.

EXAMPLE 50

1.45 grams of 2-amino-5-nitrothiazole were diazotized and the diazonium compound obtained was coupled with 1.46 grams of N-β-cyanoethylaniline. Diazotization, coupling and recovery of the dye compound formed were carried out in accordance with the general procedure described in Example 1. The dye compound obtained colors cellulose acetate textile materials red shades.

By the use of 1.88 grams of N-ε-cyanopentylaniline in the above example, a dye compound is obtained which colors cellulose acetate textile materials rubine shades.

The compounds tabulated hereinafter further illustrate the compounds of our invention. These compounds are prepared by diazotizing the diazo components named hereinafter and coupling the diazonium compounds obtained with the coupling components named hereinafter. The color given is that which the compounds color cellulose acetate. The diazotization, coupling and recovery operations are carried out in accordance with the procedure described hereinbefore.

Table I

[Diazo components: 2-amino-5-nitrothiazole and 2-amino-4-methyl-5-nitrothiazole.]

| Coupling Component | Color |
|---|---|
| 1. N-n-butylaniline | rubine. |
| 2. N-β-hydroxyethylaniline | Do. |
| 3. N-β-hydroxypropylaniline | Do. |
| 4. N-γ-hydroxypropylaniline | Do. |
| 5. N-β,γ-dihydroxypropylaniline | Do. |
| 6. N-β-hydroxy-β-ethoxyethoxyaniline | Do. |
| 7. N-CH₂CH₂COOC₂H₅-aniline | Do. |
| 8. N-γ-ethoxypropylaniline | Do. |
| 9. N-β-phosphonoethylaniline | Do. |
| 10. N-β-hydroxyethyl-o-chloroaniline | Do. |
| 11. N-(4,5-dihydroxyamyl)-2-methoxy-5-acetaminoaniline | blue. |
| 12. N-(3-methoxy-2-hydroxypropyl)-m-chloroaniline | violet. |
| 13. N-(3-methoxy-2-hydroxypropyl)-2-ethoxy-5-acetaminoaniline | blue. |
| 14. N-(2,3-dimethoxypropyl)-2-methoxy-5-methylaniline | Do. |
| 15. N-(3-methoxy-2-methyl-2-hydroxypropyl)-2-methoxy-5-methylaniline | Do. |
| 16. N-β-cyanoethylaniline | violet. |
| 17. N-γ-cyanopropylaniline | Do. |
| 18. N-β-phosphonoethyl-2,5-dimethylaniline | Do. |
| 19. N-γ-phosphonopropylaniline | rubine. |

Table 2

[Diazo components: 2-amino-4-cyano-5-nitrothiazole, 2-amino-4-trifluoromethyl-5-nitrothiazole and 2-amino-4-(m-nitrophenyl)-5-nitrothiazole.]

| Coupling Components | Color |
|---|---|
| 1. N-β-hydroxyethyl-o-chloroaniline | violet. |
| 2. N-β,γ-dihydroxypropyl-2-ethoxy-5-methoxyaniline | blue. |
| 3. N-(4,5-dihydroxyamyl)-2-methoxy-5-acetaminoaniline | Do. |
| 4. N-(3-methoxy-2-hydroxypropyl)-m-chloroaniline | violet. |
| 5. N-(3-methoxy-2-hydroxypropyl)-2-ethoxy-5-acetaminoaniline | blue. |
| 6. N-(2,3-dimethoxypropyl)-2-methoxy-5-methylaniline | Do. |
| 7. N-(3-methoxy-2-methyl-2-hydroxy-propyl)-2-methoxy-5-methylaniline | Do. |
| 8. N-β-sulfatoethyl-m-toluidine | Do. |
| 9. N-β-cyanoethylaniline | reddish-blue. |
| 10. N-γ-cyanopropylaniline | Do. |
| 11. N-β-carbomethoxyethyl-m-acetaminoaniline | blue. |
| 12. N-ethyl-m-ethoxyaniline | reddish-blue. |
| 13. N-benzyl-m-ethoxyaniline | Do. |
| 14. N-β-sulfoethyl-m-ethylaniline | Do. |
| 15. N-β-phosphonoethyl-2,5-dimethylaniline | Do. |
| 16. N-γ-phosphonopropylaniline | rubine. |

The sulfatoalkyl, the sulfoalkyl, the phosphatoalkyl and the phosphonoalkyl groups which may be present in our new dye compounds can be present in their free acid form or any suitable salt form such as, for example, the Na, K, NH₄, Mg, Ca or Li salt form.

In order that the preparation of the azo compounds of our invention may be entirely clear the preparation of certain intermediates used in their manufacture is described hereinafter.

2-amino-4-phenylthiazole 160 grams of bromine were added dropwise, with stirring, to a slurry of 120 grams of acetophenone and 152 grams of thiourea in a suitable reaction vessel. Heat was evolved and stirring became difficult.

The reaction mixture was heated on a steam bath overnight after which 2.5 liters of hot water (85° C.→) were added. The reaction mixture was stirred to effect solution and then filtered while hot. On cooling, the hydrobromide salt of 2-amino-4-phenylthiazode crystallized. Then concentrated ammonium hydroxide was added to the cold reaction mixture until it became slightly alkaline. The reaction mixture was filtered and the 2-amino-4-phenylthiazole collected on the filter was washed once with water and dried. A yield of 126 grams was thus obtained. Upon recrystallization from ethyl alcohol 2-amino-4-phenylthiazole melting at 144° C.–146° C. was obtained.

2-amino-4-(m-nitrophenyl)thiazole 160 grams of bromine were added dropwise, with stirring, to a mixture of 165 grams of m-nitroacetophenone and 152 grams of thiourea in a suitable reaction vessel. Toward the end of the bromine addition the reaction mixture became a slurry.

After heating on a steam bath overnight, the reaction product was dissolved by pouring the reaction mixture into 4 liters of hot water and the resulting solution was filtered while hot. Upon cooling, the hydrobromide salt of 2-amino-4-(m-nitrophenyl)thiazole crystallized. Then concentrated ammonium hydroxide was added to the cold reaction mixture until it became slightly alkaline. The reaction mixture was filtered and the 2-amino-4-(m-nitrophenyl)thiazole collected on the filter was washed once with water and dried. The yield of crude product was 87% of the theory. Upon recrystallization twice from ethyl alcohol 2-amino-4-(m-nitrophenyl)thiazole melting at 178° C.–180° C. was obtained.

2-amino-4-(m-nitrophenyl)-5-nitrothiazole 60 grams of 2-amino-4-(m-nitrophenyl)thiazole were dissolved at 15° C. in 300 cc. of $H_2SO_4$. 13.3 cc. of fuming nitric acid (90%, density 1.5, 5% excess) were added at 10° C.–15° C. and the reaction mixture was allowed to stand overnight. Then the reaction mixture was stirred into ice and the reaction product filtered off. The reaction product was slurried with sodium bicarbonate until neutral and then with water. Upon recrystallization from nitrobenzene the 2-amino-4-(m-nitrophenyl)-5-nitrothiazole reaction product melted at 236–237° C.

2-acetamido-4-phenylthiazole 15 grams of 2-amino-4-phenylthiazole were heated on a steam bath with 50 cc. of acetic anhydride. Solution first occurred and then the reaction product precipitated. The reaction mixture was cooled, poured into water and stirred until excess acetic anhydride had reacted. Then the reaction mixture was filtered and the 2-acetamido-4-phenylthiazole collected on the filter was dried. Upon recrystallization from ethyl alcohol it melted at 206° C.–208° C.

2-amino-4-phenyl-5-nitrothiazole

The 2-acetamido-4-phenylthiazole prepared as described above was nitrated in sulfuric acid with fuming nitric acid in accordance with the procedure described in connection with 2-amino-4-(m-nitrophenyl)-5-nitrothiazole. Upon recrystallization from an acetic acid-water mixture the 2-acetamido-4-phenyl-5-nitrothiazole reaction product melted at 215° C.–224° C. 7 grams of the acetamido reaction product were hydrolyzed to the amino compound using 45 cc. of HCl, 90 cc. of $H_2O$ and 90 cc. of acetic acid. The 2-amino-4-phenyl-5-nitrothiazole thus obtained was recrystallized from nitrobenzene. The purified product sintered and darkened at 245° C. and decomposed at 260° C.

2-amino-4-trifluoromethylthiazole

This compound was prepared by reacting 14 grams (0.0955 mole) of 3-chloro-1,1,1-trifluoro-2-propanone and 7.26 grams of thiourea in 50 cc. of water for 4 hours on a steam bath. After making the reaction mixture slightly basic with sodium carbonate a yellow precipitate of 2-amino-4-trifluoromethylthiazole formed and was recovered by filtration and dried. It melted at 58° C.–60° C.

2-amino-4-trifluoromethyl-5-nitrothiazole

This compound is prepared by nitrating 2-amino-4-trifluoromethylthiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-trifluoromethyl-5-nitrothiazole is filtered off, washed with water and dried.

2-amino-4-cyanothiazole

This compound is prepared by reacting equal molar quantities of thiourea and bromopyruvonitrile in ethyl alcohol.

2-amino-4-cyano-5-nitrothiazole

This compound is prepared by nitrating 2-amino-4-cyanothiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-cyano-5-nitrothiazole is filtered off, washed with water and dried.

2-amino-4-methylthiazole

This compound melting at 44° C.–45° C. is obtained in a 70–75% yield by reacting thiourea and chloroacetone together in accordance with the procedure described by Byers and Dickey in Organic Syntheses, Collective volume 2, page 31 (1943).

2-amino-4-alkylthiazole compounds having the general formula:

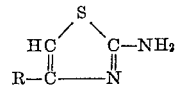

wherein R represents an alkyl group having 1 to 6, inclusive, carbon atoms are prepared by reacting thiourea with a ketone having the formula:

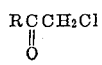

wherein R represents an alkyl group having 1 to 6, inclusive, carbon atoms. The reaction is carried out in accordance with the procedure used in preparing 2-amino-4-methylthiazole.

Compounds having the formula:

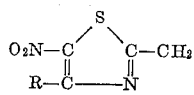

wherein R represents an alkyl group having 1 to 6, inclusive, carbon atoms are prepared by nitrating the corresponding unnitrated compound with fuming nitric acid in sulfuric acid at a temperature of about 5° C. The reaction is carried out using the general procedure described in connection with the preparation of 2-amino-4-trifluoromethyl-5-nitrothiazole.

2-amino-4-phenyl-5-nitrothiazole and 2-amino-4-(m-nitrophenyl)-5-nitrothiazole also can be prepared by the procedures referred to in chapter 8 of Organic Reactions, volume VI, published by John Wiley and Sons, Inc. (e. g. see pages 380 and 398). The procedures described or indicated herein are used in the preparation of the other 2-amino-4-substituted phenyl-5-nitrothiazole compounds referred to herein.

The azo dye compounds of our invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

We claim:

1. The azo compounds having the general formula:

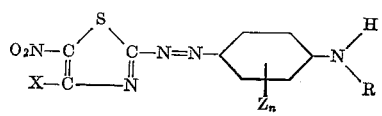

wherein R represents a member selected from the group consisting of an alkyl group having 1 to 10, inclusive, carbon atoms, an alkoxyalkyl group having 3 to 6, inclusive, carbon atoms, a hydroxyalkyl group having 2 to 5, inclusive, carbon atoms, a cyanoalkyl group having 2 to 6, inclusive, carbon atoms, a sulfoalkyl group having 2 to 4, inclusive, carbon atoms, a sulfatoalkyl group having 2 to 5, inclusive, carbon atoms, a phosphatoalkyl group having 2 to 5, inclusive, carbon atoms, a phosphonoalkyl group having 2 to 5, inclusive, carbon atoms, a $\beta$-nitroethyl group, an alkenyl group having 2 to 4, inclusive, carbon atoms, a cyclohexyl group, a cyclopentyl group, a benzyl group, a phenethyl group, a chlorallyl group, and a $-(CH_2)_m-COOR_1$ group, wherein $m$ is selected from 1, 2 and 3 and $R_1$ represents an alkyl group having 1 to 4, inclusive, carbon atoms, X represents a member selected from the group consisting of a hydrogen atom, an alkyl group having 1 to 6, inclusive, carbon atoms, a cyano group, a trifluoromethyl group and a

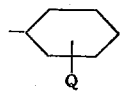

group wherein Q represents a member selected from the group consisting of a hydrogen atom, a nitro group, a chlorine atom, a bromine atom and an alkyl group having 1 to 4, inclusive, carbon atoms, Z represents a member selected from the group consisting of an alkyl group having 1 to 4, inclusive, carbon atoms, an alkoxy group having 1 to 4, inclusive, carbon atoms, a chlorine atom, a bromine atom, a fluorine atom and and a

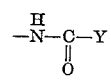

group, wherein Y represents an alkyl group having 1 to 3, inclusive, carbon atoms and $n$ is selected from 0, 1 and 2.

2. The azo compounds having the general formula:

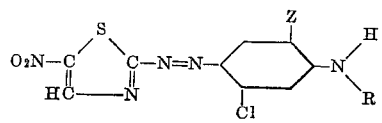

wherein R represents a hydroxyalkyl group having 2 to 5, inclusive, carbon atoms and Z represents an alkoxy group having 1 to 4, inclusive, carbon atoms.

3. The azo compounds having the general formula:

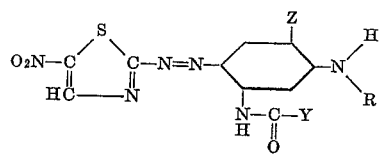

wherein R represents a hydroxyalkyl group having 2 to 5, inclusive, carbon atoms, Y represents an alkyl group having 1 to 3, inclusive, carbon atoms and Z represents an alkoxy group having 1 to 4, inclusive, carbon atoms.

4. The azo compounds having the general formula:

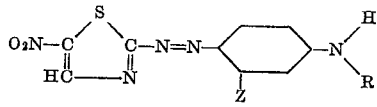

wherein R represents a hydroxyalkyl group having 2 to 5, inclusive, carbon atoms and Z represents a halogen atom having an atomic weight of from 19 to 80.

5. The azo compound having the formula:

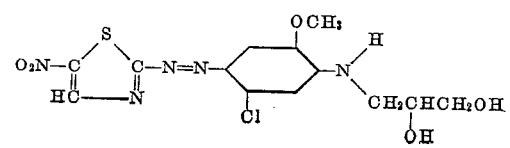

6. The azo compound having the formula:
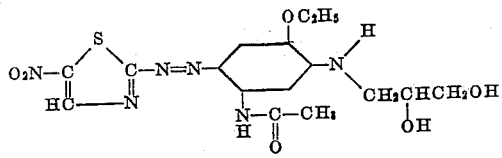
7. The azo compound having the formula:
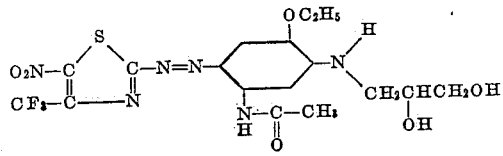
8. The azo compound having the formula:
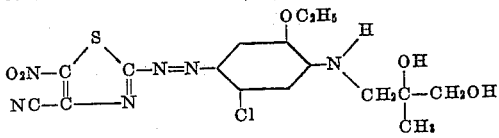
9. The azo compound having the formula:
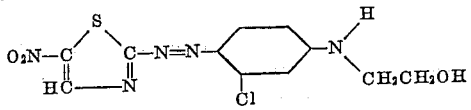
References Cited in the file of this patent
FOREIGN PATENTS
| Number | Country | Date |
|---|---|---|
| 551,434 | Great Britain | Feb. 22, 1943 |
| 587,134 | Great Britain | Apr. 15, 1947 |